(12) United States Patent
Moore et al.

(10) Patent No.: US 8,665,375 B2
(45) Date of Patent: Mar. 4, 2014

(54) APPARATUS AND METHOD FOR TRACKING THE LOCATION OF A POINTING ELEMENT IN A CROPPED VIDEO FIELD

(75) Inventors: John S. Moore, Middleton, WI (US); Mark Spychalla, Madison, WI (US); Victor W. Marsh, Fitchburg, WI (US)

(73) Assignee: WSI Corporation, Andover, MA (US)

( * ) Notice: Subject to any disclaimer, the term of this patent is extended or adjusted under 35 U.S.C. 154(b) by 1290 days.

(21) Appl. No.: 12/488,958

(22) Filed: Jun. 22, 2009

(65) Prior Publication Data

US 2010/0321290 A1    Dec. 23, 2010

(51) Int. Cl.
*H04N 9/74* (2006.01)
*G06F 5/08* (2006.01)
*G06F 3/01* (2006.01)
*G06F 17/30* (2006.01)

(52) U.S. Cl.
USPC ............ 348/590; 715/764; 382/103; 345/157

(58) Field of Classification Search
USPC ................. 348/141, 143, 169, 586, 589, 598; 382/103, 106, 107; 345/157; 715/764, 715/856–858, 862
See application file for complete search history.

(56) References Cited

U.S. PATENT DOCUMENTS

| | | | | |
|---|---|---|---|---|
| 4,409,618 A * | 10/1983 | Inaba et al. | .................... | 348/590 |
| 5,270,820 A | 12/1993 | Fellinger | | |
| 5,680,560 A * | 10/1997 | Gaertner | ....................... | 715/764 |
| 6,956,576 B1 * | 10/2005 | Deering et al. | ................ | 345/475 |
| 7,567,702 B2 * | 7/2009 | Woodfill et al. | ............... | 382/154 |
| 8,253,730 B1 * | 8/2012 | Carr | ............................... | 345/419 |
| 8,379,926 B2 * | 2/2013 | Kanhere et al. | ............... | 382/104 |
| 2001/0030668 A1 * | 10/2001 | Erten et al. | ..................... | 345/863 |
| 2002/0191861 A1 | 12/2002 | Cheatle | | |
| 2003/0152291 A1 | 8/2003 | Cheatle | | |
| 2005/0229108 A1 * | 10/2005 | Sadek et al. | ................... | 715/764 |
| 2006/0033712 A1 * | 2/2006 | Baudisch et al. | ............. | 345/157 |
| 2006/0280335 A1 * | 12/2006 | Tomita et al. | .................. | 382/103 |
| 2008/0030463 A1 * | 2/2008 | Forest | ........................... | 345/156 |
| 2010/0289801 A1 * | 11/2010 | Nachmanson | ................ | 345/440 |

\* cited by examiner

*Primary Examiner* — Victor Kostak (74) *Attorney, Agent, or Firm* — Meunier Carlin & Curfman, LLC (57) ABSTRACT

An apparatus for tracking a pointing device in use by a foreground subject in a sequence of video fields having a foreground component and a background component, where the pointing device is the leftmost or rightmost object within the foreground component. The apparatus determines the boundaries of a cropped video field within each of the video fields and determines a pixel value and scan line representing the leftmost and rightmost positions of the foreground subject and pointing device for that cropped video field. The apparatus determines the centerline of the foreground subject for each cropped video field, and using the centerline, determines whether the pointing device is on the right side of the cropped video field or the left side of the cropped video field. The position of the pointing device is stored after receipt of a signal generated by the foreground subject.

15 Claims, 6 Drawing Sheets

APPARATUS AND METHOD FOR TRACKING THE LOCATION OF A POINTING ELEMENT IN A CROPPED VIDEO FIELD

FIELD OF THE INVENTION

The present invention pertains generally to apparatuses and methods for generating and presenting multimedia presentations, such as live televised weather report presentations, and, more particularly to apparatuses and methods for generating and presenting such presentations wherein a live on-screen presenter appears and interacts with computer generated and/or other graphics and/or text in a presentation scene using a pointing element.

BACKGROUND

Various apparatuses and methods have been developed for providing viewers of broadcast and cable television weather presentations with informative and accurate weather information. Typically, such apparatuses provide a display of representations of weather phenomena, e.g., clouds, rain, storms, etc., overlaid on a map of a geographical area of interest. Such displays were originally created by drawing representations of weather phenomena, or placing pre-made weather phenomenon symbols, on a physical map of an area of interest. The image of the map was then broadcast to viewers, usually with a weather presenter positioned in front of the map to provide an explanation of the map display. Computer apparatuses now are employed to facilitate the generation of weather report displays, using computer-generated graphics and animation.

A typical computer-implemented apparatus for preparing a weather presentation will include detailed digital maps of geographic areas of interest stored for access by the computer. Weather information, such as satellite imagery and/or weather radar information, such as NEXRAD weather radar information provided by the government or live local radar data, is provided to the apparatus. The apparatus scales the received weather information, which is then overlaid on the digital maps to create a graphic display of the weather for a particular area of interest. Weather information received by the apparatus may be processed to generate weather symbols, color contours, or other representations of the weather information that are overlaid on the digital maps to create the weather display. A series of such weather displays may be generated by the computer apparatus, and played back in sequence to provide an animated image of the movement of weather phenomena through a geographic area. Such apparatuses may provide an operator with various tools for selecting, e.g., the geographic location to be displayed, reference points to be displayed on the geographic map, e.g., cities, roads, borders, etc., the source of the weather information to be displayed on the geographic map, e.g., satellite imagery or radar, and how the weather information will be represented, e.g., symbols, color contours, etc. Weather forecast displays are generated in a similar manner using weather forecast information obtained from various sources, such as, for example, weather forecast models.

Using an apparatus as described above, a series of scenes may be generated that are combined to form a complete weather report presentation of past, present, and/or future weather conditions for one or more geographic areas of interest to the viewers thereof. Typically at least a portion of such a weather presentation, i.e., at least some of the computer generated scenes forming the presentation, are presented to viewers by an on-screen weather presenter who appears in front of or as part of the computer generated scene while explaining the information presented therein. This effect is achieved by positioning the weather presenter in front of a background screen of a particular background color, e.g., typically a green or blue screen. A camera captures the image of the presenter in front of the screen and provides that image to a computer which replaces each picture element (pixel) in the camera image having the background screen color with a corresponding pixel from the computer generated weather presentation scene. Thus, the weather presenter appears in the computer generated scene in the weather report presentation. This combined scene, with the weather presenter appearing in the computer generated scene, is provided on a monitor that is visible to the presenter so that the presenter can coordinate his or her position and movements in real space with the computer generated scene, e.g., to point out to viewers specific areas of interest in the computer generated scene.

In some more advanced weather report presentation apparatuses of this type the on-screen weather presenter is able to interact with the computer generated scene in which the presenter appears. For example, in such apparatuses, by movement of the presenter's hand or other part of the body, or of a pointing device held by the presenter, the presenter may draw lines, cause computer generated objects to appear or disappear, and/or move such objects around on the computer generated scene in which the presenter appears. This effect may be achieved by analyzing the image obtained by the camera of the presenter in front of the background screen to find and track the position of a pointing element, e.g., the presenter's hand, in the field of view of the camera. Exemplary apparatuses and methods for tracking a pointing element in a video field in this manner are described, for example, in U.S. Pat. Nos. 5,270,820, 5,699,442, and 6,549,659.

Using the above apparatus and method, the particular dimensions and location of the background screen are usually known and recorded, such that the location of the pointing element within the background screen can be determined. Alternatively, the background screen may be used in a carefully controlled environment where the exact location and orientation of the background screen may be easily determined based on the color used in the background screen. The orientation and/or shape of the background screen to be used in such a location may vary significantly making location of the pointing element more difficult.

Recent trends in weather presentation have introduced "on scene" weather reporting where the weather presenter makes their presentation from a location of interest, such as in a backyard setting, at a picturesque location, near where a hurricane will make landfall, etc. Providing the weather presentation in such a location is difficult given that precise determination of the boundaries, orientation, and location of a background screen, and a pointing element located therein, is difficult. Determining the boundaries and orientation of the background screen may further be difficult since the likelihood that colors that are the same as the background screen will exist in one or more non-studio locations screen is not likely.

Yet further, during an "on scene" weather report, it may be desirable to use a unconventional surface as a background screen. An example may be the side of a weather reporting van, the wall of a building, etc. The dimensions and orientation of such a background screen may be highly variable dependent on the location of interest and the size, lighting, and orientation of the unconventional surface being utilized.

What is desired is an apparatus and method for the determining the location of a pointing element in a cropped video field. What is further desired is such an apparatus and method configured to determine the boundaries of the cropped video field independent of the size and orientation of the surface providing the cropped video field.

SUMMARY

The present application provides an apparatus and method for tracking the location of a pointing element in a cropped video field. To determine the cropped video field, the largest continuous background in a video image may be defined. The convex hull of the background image may be computed to define the cropped video field. In the calculated cropped video field, tracking of the location of the pointing element may be performed using known methods.

In a sequence of video fields having a foreground component and a background component, an apparatus for tracking a pointing device in use by a foreground subject which device is the leftmost or rightmost object within the foreground component is described. The apparatus includes a control circuit for determining the boundaries of a cropped video field within each of the video fields, means for determining for each cropped video field a pixel value and scan line representing the leftmost position of the foreground subject and pointing device for that cropped video field and a pixel value and scan line representing the rightmost position of the foreground subject and pointing device for that cropped video field, means for determining the centerline of the foreground subject for each cropped video field, means using the centerline for determining whether the pointing device is on the right side of the cropped video field or the left side of the cropped video field, and means for storing the position of the pointing device after receipt of a signal generated by the foreground subject.

The present apparatus and method may be implemented in a computer based apparatus. For example, the present apparatus and method may be implemented as part of a computer based apparatus that provides the ability, in a conventional manner, to generate and/or store a variety of computer or other generated scenes from which a presentation, such as a weather report presentation, is to be formed. During the presentation of such a presentation, an on-screen presenter is positioned in front of a screen having a defined background color. A video camera obtains an image of the presenter in front of the background color screen in a conventional manner. This image is provided to the computer apparatus and combined with the scenes for the presentation to generate images of the on-screen presenter in front of or within a scene. The image of the on-screen presenter in front of the background color screen also is analyzed by the computer apparatus, using a conventional method for locating a pointing element within the camera image video field, to track the movement of a pointing element, such as the presenter's hand, in the image. A communication device, e.g., a hand held communication device with one or more buttons, is connected, either via a wired or wireless connection, to the computer apparatus. The communication device is operated by the on-screen presenter to indicate to the computer apparatus that an action is to be taken. The action to be taken depends upon the tracked position of the on-screen presenter's pointing element in the video field. A monitor may be provided in a position visible to the on-screen presenter to present to the presenter the combined image of the presenter within the presentation scene, so that the on-screen presenter is able to coordinate his or her movements and positions within the scene. The computer apparatus may be connected to a conventional television or other broadcast apparatus for broadcasting the resulting presentation, e.g., a weather report presentation, generated thereby.

During the presentation of a presentation, the on-screen presenter is positioned in front of the background color screen. The presenter is provided with the communication device, e.g., a multi-button signaling or communication device held by the presenter in his or her hand. The video image of the on-screen presenter in front of the background color screen is captured and combined with the first scene in the presentation in a conventional manner to provide a combined video image of the on-screen presenter in front of or within the first scene. This combined image is provided on a monitor as feedback to the on-screen presenter, so that the on-screen presenter is able to coordinate his or her movements and positions within the scene in which the presenter appears. The image of the presenter in front of the background color screen also is analyzed to track the location of a pointing element, e.g., the presenter's hand, within the video field. As the onscreen presenter moves the pointing element into a location in space corresponding to a position in the scene, the on-screen presenter may indicate that a scene change is to be made by using the hand held-communication device, e.g., by selecting the appropriate button on the device. In response to this scene change signal, the apparatus launches a new scene of the presentation to replace the current scene, with the specific scene launched being the destination scene associated with the launch area indicated by the onscreen presenter. The on-screen presenter may repeat this procedure with the second and subsequent scenes, thereby proceeding through a sequence of scenes to present the presentation.

Further objects, features and advantages of the present invention will be apparent from the following detailed description taken in conjunction with the accompanying drawings.

DETAILED DESCRIPTION

The present application provides an apparatus and method for use in the generation and presentation of presentations such as video and other multi-media presentations. An on-screen presenter may appear as part of the presentation in front of a background screen utilizing a pointing element to control the flow of the presentation. The background screen will be analyzed to determine a cropped video field and determine the location of the pointing element therein. The present apparatus and method will be described in detail herein with reference to the exemplary application thereof to the generation and presentation of a televised or otherwise broadcast weather report presentation. It should be understood, however, that the present apparatus and method also may be applicable to other types of video and other presentations in which an on-screen presenter appears within or as part of computer or otherwise generated scenes using a pointing element within a cropped video field to control the presentation.

Figure 1:
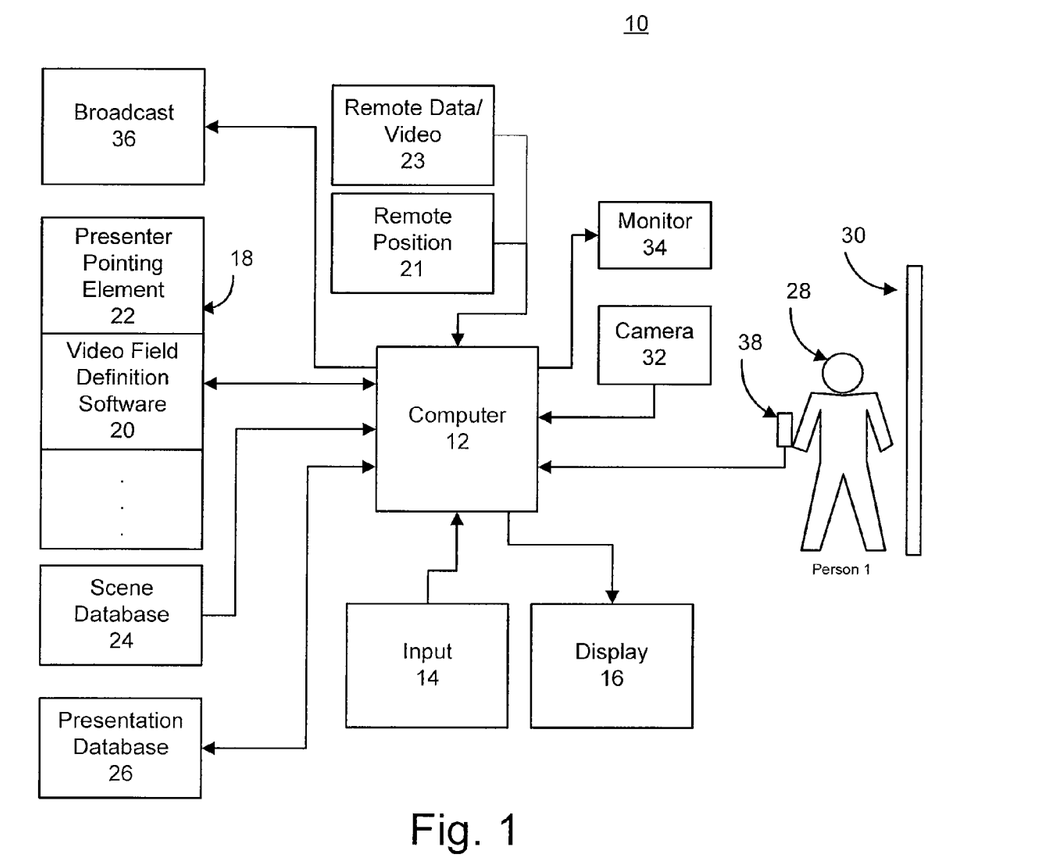
FIG. 1 is a schematic block diagram of an exemplary computer-based apparatus for implementing an apparatus and method for tracking the location of a pointing element in a cropped video field in accordance with the present application.

An exemplary apparatus 10 in which a method for tracking a pointing element in a cropped video field may be implemented is illustrated in, and will be described with reference to, the schematic block diagram of FIG. 1. The present apparatus and method may be implemented in a conventional computer apparatus 12, such as a single general purpose computer or a plurality of such computers networked or otherwise coupled together to perform the functions to be described herein. For example, the present apparatus and method may be implemented in the conventional computer apparatuses currently used in television operations to generate, define, and/or present, either for recording or for live broadcast, video or multi-media presentations including computer generated or other scenes in which an on-screen presenter appears. Computer apparatus 12 may be implemented as a control circuit. Those skilled in the art will recognize and appreciate that such a control circuit can comprise a fixed-purpose hard-wired platform or can comprise a partially or wholly programmable platform. All of these architectural options are well known and understood in the art and require no further description here. This control circuit 12 can be configured (using, for example, programming as will be well understood by those skilled in the art) to carry out one or more of the steps, actions, or functions described herein. The computer apparatus 12 may be provided with conventional input devices 14, such as a keyboard, mouse, etc., and display devices 16, such as a computer monitor, to allow an operator of the apparatus to interact with the computer programs implemented on the computer 12 to generate, define, and control presentation of a video or multi-media presentation as described herein.

Conventional memory 18 is provided as part of, or accessible by, the computer apparatus 12. The memory 18, e.g., including disk memory, RAM, and/or ROM, etc., holds the various computer programs that are run on the computer apparatus 12 to implement a scene launcher apparatus and method. Such software includes the cropped video field definition software 20, which, as will be described in more detail below, includes graphical user interface software for defining a cropped video field within a contiguous background region, as well as software for identifying the location of a pointing element within the cropped video field. The present apparatus and method may also employ software 22 for tracking a pointing element in a video field, e.g., for tracking the position of the hand of an on-screen presenter appearing in the presentation. Exemplary apparatuses and methods for tracking a pointing element in a video field in this manner are described, for example, in U.S. Pat. Nos. 5,270,820, 5,699,442, and 6,549,659, the details of which are incorporated herein by reference. Other apparatuses and methods for tracking a pointing element in a video field also may be employed. Memory 18 may also contain other conventional software programs necessary for general operation of the computer apparatus 12. Based on the detailed functional description, flow chart diagrams, and exemplary screen displays provided herein, a person of ordinary skill in the art of software programming in the field of computer graphics and video or multi-media presentations will be able to implement an apparatus and method without undue experimentation.

As will be described in more detail below, an apparatus 10 in accordance with the present apparatus and method is used to identify the location of a pointing element within a cropped video field. The cropped video field may be defined by locating the largest contiguous background region within one or more background scenes forming a presentation. The scenes forming the presentation may be conventional substantially two-dimensional background scenes, in which the presenter appears in front of the scene elements, or more three-dimensional scenes, in which scene objects may appear both behind and in front of the presenter. An apparatus and method for generating three-dimensional scenes of this type is described, for example, in U.S. Pat. No. 6,335,765 to Daly, et al., entitled Virtual Presentation Apparatus and Method, the details of which are incorporated herein by reference. One or more presentations may be defined using one or more scenes and stored in a presentation database 26.

During the presentation of a presentation employing a method for tracking the location of a pointing element in a cropped video field, an on-screen presenter 28 is positioned in front of a screen 30 having a pre-selected background color. The screen 30 may be any type of screen having a contiguous background region, usually a blue or green color. One exemplary screen 300 may be a plywood board having blue or green paint thereon. A video image of the presenter 28 in front of the background color screen 30 is obtained in a conventional manner using a conventional video camera 32 and is provided, in digital format (e.g., using conventional analog-to-digital video conversion), to the computer apparatus 12. Within the computer apparatus 12 the video image of the presenter 28 in front of the background screen 30 is combined with video scenes by replacing picture elements (pixels) of the video image of the presenter 28 in front of the screen 30 having the background screen color with corresponding pixels of a video scene. The resulting combined video image, therefore, shows the presenter 28 in front of or as part of the scene. This combined image may be provided as feedback to the presenter 28 on a conventional video monitor 34, positioned in the field of view of the presenter 28, such that the presenter 28 may coordinate his or her movements and positions with the scene in which the presenter 28 appears. This combined video image also may be broadcast 36 in a conventional manner or recorded for broadcast at a later time.

The video image of the on-screen presenter 28 in front of the background color screen 30 may also be analyzed by the computer 12 using the pointing element tracking software 22 to track the position of a pointing element, e.g., the presenter's hand, in the video image field. A communication device 38 also is provided to the presenter 28, whereby the presenter 28 may send a signal to the computer apparatus 12 while the presenter 28 appears onscreen as part of the presentation. The communication device 38 may be implemented, for example, as a hand-held device having one or more buttons. The communication device may also, or alternatively, include a foot pedal or other foot-operated device. The communication device 38 may be coupled via a wired or wireless connection 40 to the computer apparatus 12 such that computer apparatus 12 receives a signal generated by the presenter.

Figure 2:
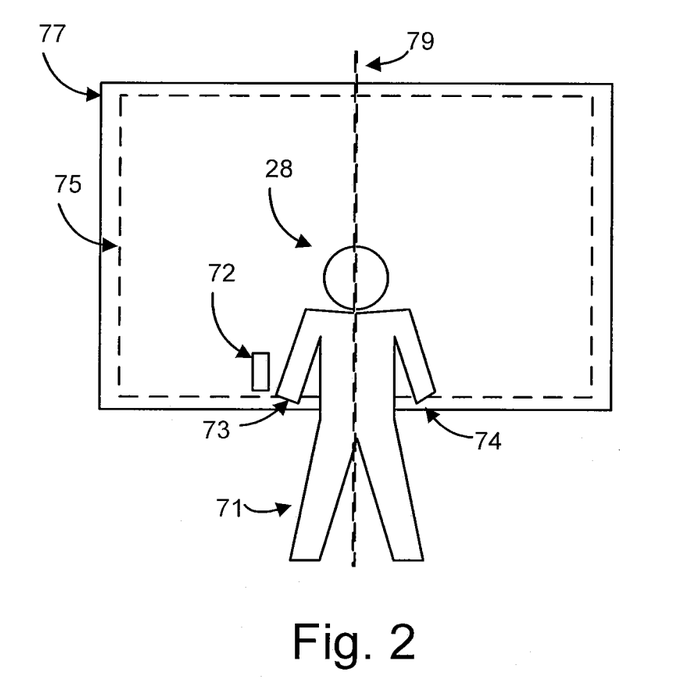
FIG. 2 is a flow chart diagram illustrating exemplary steps in a incorporating a method for tracking the location of a pointing element in a cropped video field in accordance with the present application.

An exemplary method for using a method for tracking the location of a pointing element in a cropped video field now will be described in detail with reference to FIG. 2. FIG. 2 is a view including a foreground subject 71 and a pointing device 73, in front of a cropped video field 75 of a video field 77 representing a background such as a weather map being displayed on a green screen. The foreground subject shows the positioning of a centerline 79 which may be used to determine the position of the pointing device 73.

Control circuit 12 may be configured to scan to cropped video field 75 to identify a pixel value and scan line representing a leftmost position of the foreground subject and pointing device 72 for that cropped video field and a pixel value and scan line representing the rightmost position of the foreground subject and pointing device 74. Although a particular method for identifying the location of pointing device 73 is shown and described, any of a variety of known methods for identifying the location of the pointing device 73, represented by the further extension from centerline 79, may be utilized.

Figure 3:
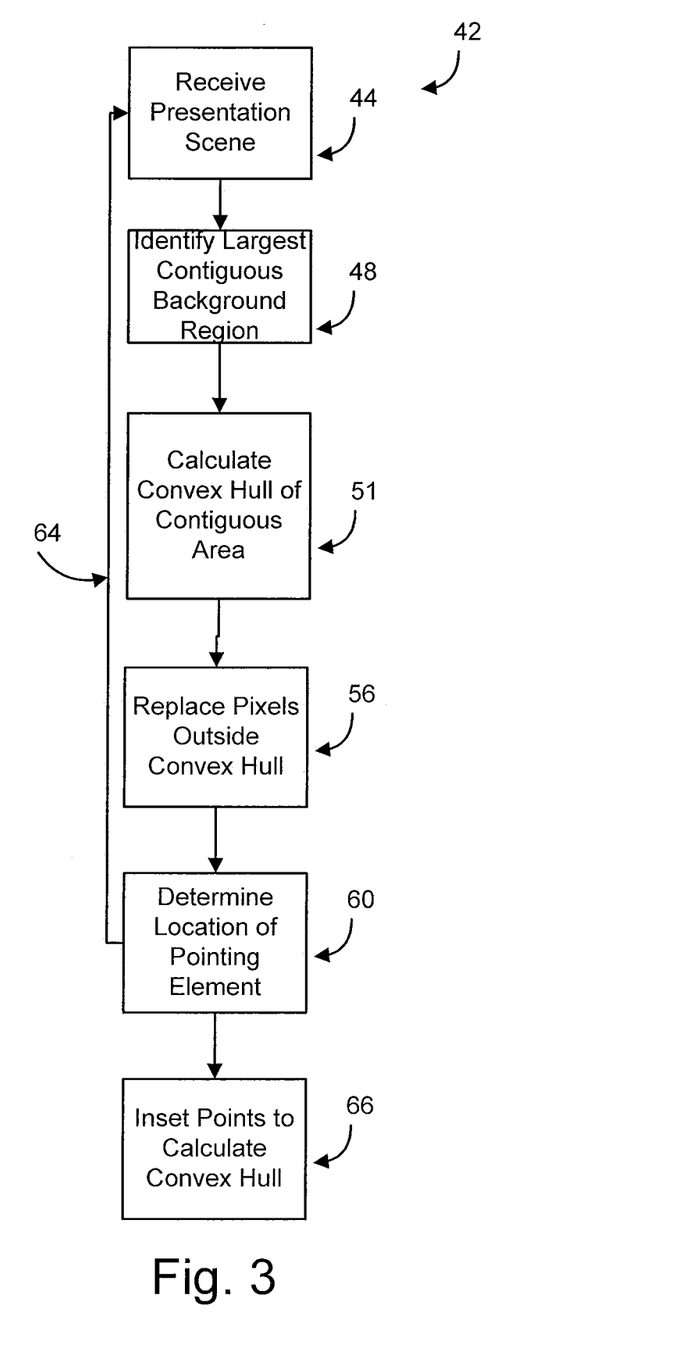
FIGS. 3-5 are exemplary screen shots illustrating an exemplary video field and the steps performed in implementing a method for tracking the location of a pointing element in a cropped video field in accordance with the present application.
Figure 4:
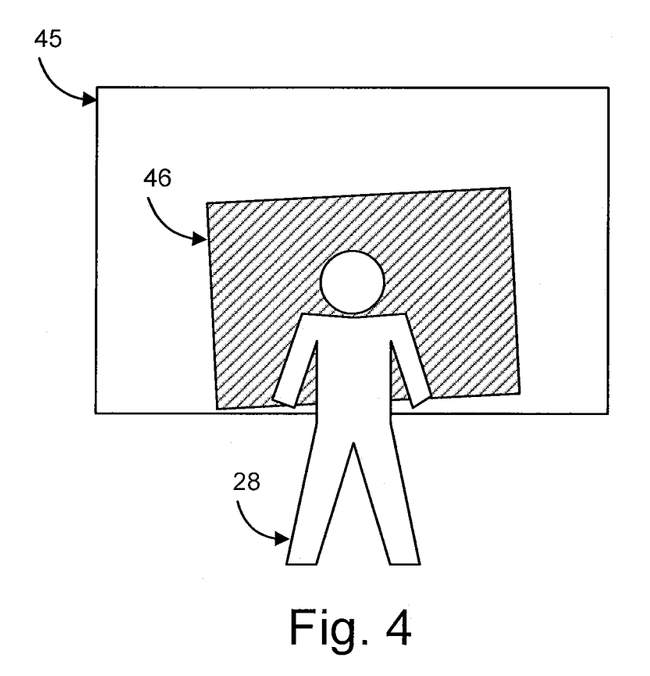
Figure 5:
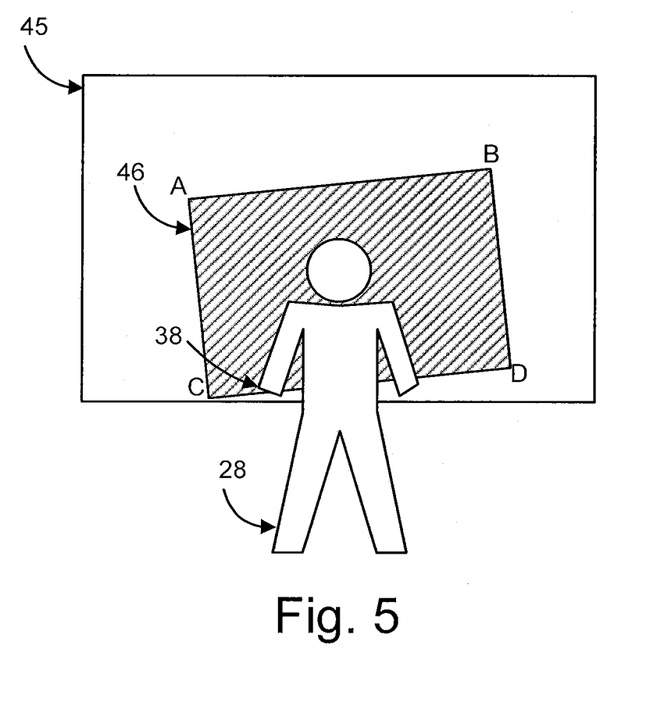

An exemplary method for using a method for tracking the location of a pointing element in a cropped video field now will be described in detail with reference to the flow chart diagram 42 of FIG. 3 and the exemplary screen shots which follow in FIGS. 4-6. An exemplary presentation scene 45 including a background scene 46 and the presenter 28 is presented in FIGS. 4-6.

According to the exemplary embodiment, presentation scene 45 may be an "on scene" presentation scene and/or the background scene 46 may be a non-standard background scene. An "on scene" presentation scene is usually a live presentation scene where the orientation and/or configuration of the background scene 46 is likely to be non-standard, non-uniform, and/or blurred by one or more additional objects in the background scene. A standard background scene has a well-defined location and a known rectangular configuration that can easily be located and defined within the presentation scene. A non-standard background scene may not have a uniform shape or a well-defined location within the background scene. In an "on scene" presentation scene, the precise boundaries of the background scene may also be blurred by one or more objects in the background scene. For example, where the presentation scene is a "Backyard Weather Report" presentation scene, trees, bushes, and grass may have the same color as a green painted plywood board being used as a background scene causing poor definition of the boundaries of the background scene when the presentation scene image is analyzed by the tracking software 22.

A non-uniform or non-determinable background scene can cause problems when the background scene is being replaced with one or more video scenes to be displayed behind the presenter 28. The video scene to be displayed is usually in a traditional video format, such as 4:3 or 16:9. When the video scene is displayed on a non-rectangular surface, portions of the scene may be cut off and/or the edges of background scene may be displayed around the replacement video scene.

Further, determining the location of a pointing element, such as the extended arm of the presenter 28 may further be made difficult where the boundaries of the background scene are not well-defined. For example, where the offset from an edge of background scene 46 is used to define the location of the pointing element and the edge is non-uniform, the determined location of the tracked pointing may vary dramatically. Further, control circuit 12 may begin tracking to location of other objects, such as rocks, trees, sky, etc., to identify the location of pointing device 73, interfering with the control circuit's ability to properly track the location of pointing device 73.

In a step 44, video field cropping apparatus 20 may receive a presentation scene 45. Receiving a first presentation scene 45 may include uploading a frame and/or a series of frames in a video field. The presentation scene may be sent directly from the camera 32 and/or loaded from a presentation database 26. The presentation scene may be a digital image defined by a polarity of picture elements (pixels) that may be individually analyzed.

Within the presentation scene, software 22 may be configured to analyze the picture elements to locate the largest contiguous background region in a step 48. The largest background region may be defined as the largest grouping of picture elements having a uniform color. Referring now to FIG. 4, background scene 46 a cropped video field would be identified by apparatus 20 as the largest contiguous region in presentation scene 45. The contiguous area may be defined by the apparatus 20, for example, by using the graphical X and Y coordinates in the presentation scene to indicate the boundaries of a cropped video field. It should be noted that each contiguous area thus defined by computer apparatus 12 to have any shape, size, and location within presentation scene 45.

For the largest contiguous area located within presentation scene 45, a convex hull of the contiguous area may be calculated in a step 51. A convex hull is the boundary of the minimal convex set of points within the background area 46 containing a given non-empty finite set of points. Calculating the convex hull allows apparatus 20 to maximize the space used to display the replacement video scene. Referring now to FIG. 5, the convex hull of the set of points defined by the set of points {A, B, C, D}, is the background region that is used to define the cropped video field. The convex hull is configured to include the upper half of the presenter such that the upper half of the presenter is within the convex hull and the background scene 46. The cropped video field defined by the set of points {A, B, C, D} may be set to the dimensions of a standard video field image, such as the 16:9 or 4:3 fields described above, such that the standard video field image lies within the convex hull.

Figure 6:
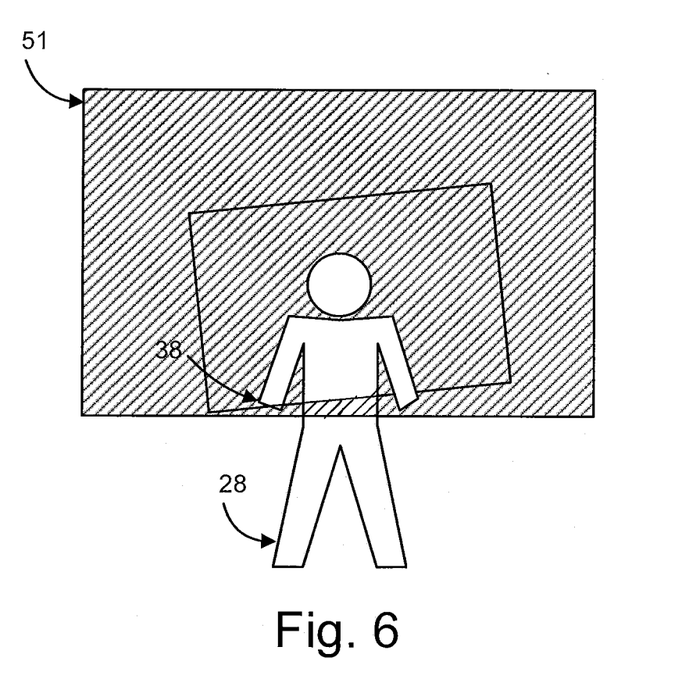

Referring now to FIG. 6, apparatus 20 may be used to replace all of the pixels that lie outside of the convex hull of step 51 with the background color defined by the region 46 to generate a standardized presentation scene 57 in a step 56 to generate a isolated presenter 28 having a well defined pointing element 38, shown by the outstretched arm of presenter 28. Advantageously, replacing the pixels outside of background scene 48 will remove non-uniform objects, such as trees, bushes, leaves, etc. from the presentation scene 45 space that is used by tracking apparatus 22 to determine the location of pointing element 38 in a step 60. The upper half of the presenter is within the convex hull such that the location of the presenter and pointing device 76 (such as the presenter's outstretched arm) are within the background scene 46. The lower half of the presenter will be defined as being outside the convex hull as will be replaced for tracking purposes. The method may recur iteratively for each digital image used to generate the presentation scene.

In a step 66, apparatus 22 may optionally be configured to slightly inset the location of the points used to calculate the convex hull. Insetting the location of the boundaries of the cropped video field further reduces the likelihood that effects such as leaves swaying on trees, effects of a moving camera changing the dimensions of cropped video field 75, etc. will interfere with the tracking of pointing element 73. Insetting the point has also the effect of corner pinning the video image such that the background scene 46 used to display the replacement field correlates to a standard video image format.

It should be understood that the present invention is not limited to the particular exemplary applications and embodiments illustrated and described herein, but it embraces such modified forms thereof as come within the scope of the following claims. In particular, it should be noted that the present invention is not limited to the particular order or sequence of 5 steps for defining or presenting a video presentation using a scene launcher method as illustrated and described herein.

What is claimed is:

1. In a sequence of video fields having a foreground component and a background component, an apparatus for tracking a pointing device in use by a foreground subject which device is the leftmost or rightmost object within the foreground component, comprising:
   a control circuit configured to:
   a) determine the boundaries of a cropped video field within each of the video fields;
   b) determine for each cropped video field a pixel value and scan line representing the leftmost position of the foreground subject and pointing device for that cropped video field and a pixel value and scan line representing the rightmost position of the foreground subject and pointing device for that cropped video field;
   c) determine the centerline of the foreground subject for each cropped video field;
   d) use the centerline for determining whether the pointing device is on the right side of the cropped video field or the left side of the cropped video field; and
   e) store the position of the pointing device after receipt of a signal generated by the foreground subject,
   wherein the boundaries of the cropped video field are determined by locating the largest contiguous block of pixels having a uniform color.

2. The apparatus of claim 1, wherein the boundaries of the cropped video field are determined by calculating a convex hull of the largest contiguous block of pixels having a uniform color.

3. The apparatus of claim 1, further including means for insetting the location of the boundaries of the cropped video field.

4. The apparatus of claim 3, wherein the boundaries of the cropped field are inset to match the dimension of a standard video field image.

5. In a sequence of video fields having a foreground component and a background component, an apparatus for tracking a pointing device in use by a foreground subject which device is the leftmost or rightmost object within the foreground component, comprising:
   a control circuit configured to:
   a) determine that the background component is non-uniform;
   b) determine the boundaries of a cropped video field within each of the video fields;
   c) determine for each cropped video field a pixel value and scan line representing the leftmost position of the foreground subject and pointing device for that cropped video field and a pixel value and scan line representing the rightmost position of the foreground subject and pointing device for that cropped video field;
   d) determine the centerline of the foreground subject for each cropped video field;
   e) use the centerline for determining whether the pointing device is on the right side of the cropped video field or the left side of the cropped video field; and
   f) store the position of the pointing device after receipt of a signal generated by the foreground subject.

6. In a sequence of video fields having a foreground component and a background component, a method for tracking a pointing device in use by a foreground subject which device is the leftmost or rightmost object within the foreground component comprising the steps of:
   a) determining the boundaries of a cropped video field within each of the video fields;
   b) determining for each cropped video field a pixel value and scan line representing the leftmost position of the foreground subject and pointing device for that cropped video field and a pixel value and scan line representing the rightmost position of the foreground subject and pointing device for that cropped video field;
   c) determining the centerline of the foreground subject for each cropped video field;
   d) using the centerline for determining whether the point device is on the right side of the cropped video field or the left side of the cropped video field; and
   e) storing the position of the pointing device after receipt of a signal generated by the foreground subject,
   wherein determining the boundaries of the cropped video field includes locating the largest contiguous block of pixels having a uniform color.

7. The method of claim 6, wherein determining the boundaries of the cropped video field further includes calculating a convex hull of the largest contiguous block of pixels having a uniform color.

8. The method of claim 6, further including insetting the location of the boundaries of the cropped video field.

9. The method of claim 8, wherein the boundaries of the cropped field are inset to match the dimension of a standard video field image.

10. In a sequence of video fields having a foreground component and a background component, a method for tracking a pointing device in use by a foreground subject which device is the leftmost or rightmost object within the foreground component comprising the steps of:
    a) determining the boundaries of a cropped video field within each of the video fields;
    b) determining for each cropped video field a pixel value and scan line representing the leftmost position of the foreground subject and pointing device for that cropped video field and a pixel value and scan line representing the rightmost position of the foreground subject and pointing device for that cropped video field;
    c) determining the centerline of the foreground subject for each cropped video field;
    d) using the centerline for determining whether the point device is on the right side of the cropped video field or the left side of the cropped video field;
    e) storing the position of the pointing device after receipt of a signal generated by the foreground subject and
    determining that a background screen is non-uniform requiring the use of a cropped video field.

11. In a sequence of video fields having a foreground component and a background component, an apparatus for tracking a pointing device in use by a foreground subject which device is the further extension of the foreground component, comprising:
    a control circuit configured to:
    a) determine the boundaries of a cropped video field within each of the video fields;
    b) determine for each cropped video field a location representing the furthest extension of the foreground subject representing a pointing device for that with the cropped video field; and
    c) store the position of the pointing device after receipt of a signal generated by the foreground subject,
    wherein the boundaries of the cropped video field are determined by locating the largest contiguous block of pixels having a uniform color.

12. The apparatus of claim 11, wherein the boundaries of the cropped video field are determined by calculating a convex hull of the largest contiguous block of pixels having a uniform color.

13. The apparatus of claim 11, further including means for insetting the location of the boundaries of the cropped video field.

14. The apparatus of claim 13, wherein the boundaries of the cropped field are inset to match the dimension of a standard video field image.

15. In a sequence of video fields having a foreground component and a background component, an apparatus for tracking a pointing device in use by a foreground subject which device is the further extension of the foreground component, comprising:
   a control circuit configured to:
   a) determine that the background component is non-uniform;
   b) determine the boundaries of a cropped video field within each of the video fields;
   c) determine for each cropped video field a location representing the furthest extension of the foreground subject representing a pointing device for that with the cropped video field; and
   d) store the position of the pointing device after receipt of a signal generated by the foreground subject.

\* \* \* \* \*